(12) United States Patent
Zou et al.

(10) Patent No.: US 7,958,271 B2
(45) Date of Patent: Jun. 7, 2011

(54) METHOD AND SYSTEM FOR RADIO FREQUENCY MANAGEMENT IN A MESH NETWORK WITH A PATH DISTANCE FACTOR

(75) Inventors: Xu Zou, San Jose, CA (US);
Kangchang Huang, Beijing (CN)

(73) Assignee: Aruba Networks Cayman, Grand Cayman (KY)

( * ) Notice: Subject to any disclaimer, the term of this patent is extended or adjusted under 35 U.S.C. 154(b) by 254 days.

(21) Appl. No.: 12/038,592

(22) Filed: Feb. 27, 2008

(65) Prior Publication Data
US 2008/0219185 A1    Sep. 11, 2008

Related U.S. Application Data (60) Provisional application No. 60/891,838, filed on Feb. 27, 2007.

(51) Int. Cl.
*G06F 15/16* (2006.01)
*G06F 12/00* (2006.01)
(52) U.S. Cl. ...................................................... 709/249
(58) Field of Classification Search .......... 709/220–221, 709/236–250
See application file for complete search history.

(56) References Cited

U.S. PATENT DOCUMENTS

| 5,115,495 | A | 5/1992 | Tsuchiya et al. |
| 7,073,155 | B1 | 7/2006 | Kong et al. |
| 7,428,461 | B2 * | 9/2008 | Ohnishi et al. ............... 701/214 |
| 2005/0047353 | A1 * | 3/2005 | Hares ............................ 370/255 |
| 2006/0104250 | A1 | 5/2006 | Oh et al. |
| 2006/0120370 | A1 * | 6/2006 | Ginchereau et al. .......... 370/392 |
| 2006/0167934 | A1 | 7/2006 | Nomura ..................... 707/104.1 |
| 2006/0230150 | A1 * | 10/2006 | Roy .............................. 709/226 |
| 2006/0285529 | A1 | 12/2006 | Hares et al. |
| 2007/0043501 | A1 * | 2/2007 | Fukaya et al. ................ 701/204 |
| 2008/0120171 | A1 * | 5/2008 | Ikeuchi et al. .................. 705/13 |
| 2009/0080333 | A1 * | 3/2009 | Ozer et al. .................... 370/237 |

OTHER PUBLICATIONS

PCT/US2008/055158—PCT Search Report and Written Opinion, Jul. 28, 2008, Azalea Networks.

* cited by examiner

*Primary Examiner* — Zarni Maung
(74) *Attorney, Agent, or Firm* — Blakely, Sokoloff, Taylor & Zafman LLP (57) ABSTRACT

A method and system for radio frequency management (RFM) in a mesh network using a path distance factor (PDF) is disclosed. According to one embodiment, a computer-implemented method, comprises calculating a path distance factor (PDF) between a first mesh router and a portal. A frame is transmitted to a second mesh router, wherein the frame includes the path distance factor.

15 Claims, 4 Drawing Sheets

A's successor is B

Figure 7

METHOD AND SYSTEM FOR RADIO FREQUENCY MANAGEMENT IN A MESH NETWORK WITH A PATH DISTANCE FACTOR

This application claims priority to U.S. Provisional Application Ser. No. 60/891,838, filed on Feb. 27, 2007. Priority to this prior application is expressly claimed, and the disclosure is hereby incorporated by reference in its entirety.

FIELD

The field of the invention relates generally to wireless networks and more particularly relates to a method and system for radio frequency management (RFM) in a mesh network using a path distance factor (PDF).

BACKGROUND

With recent technological advancements in computer and wireless communications, mobile wireless computing has seen increasingly widespread use and application. Not constrained by wires, users with mobile computing devices can move around freely and can communicate with one another in circumstances where there is no fixed infrastructure. In such cases, they can form a mobile ad-hoc network (MANet) or mobile wireless mesh network. A mobile wireless mesh network is an autonomous system of wireless mobile routers (and associated hosts) that can move randomly and reorganize themselves into an arbitrary network without any underlying backbone and infrastructure.

Mirroring the structure of the wired Internet, a routed wireless mesh network is highly flexible and inherently fault-tolerant. It simplifies line-of-sight problems and extends the reach and coverage of the network with a minimal amount of network infrastructure and interconnection costs.

As the Internet continues to gain in popularity, demand for broadband access has outpaced the wired infrastructure in many areas. Wireless broadband networks make high-performance access possible where the wired infrastructure is non-existent, outdated or impractical. However, the previous wireless broadband technologies have not been practical for price-sensitive mass market deployment due to a combination of technological constraints and high deployment costs.

Although originally developed for military use, wireless mesh technologies have also shown great value in commercial sectors such as metro, enterprise, campus and public safety applications. Hundreds of cities around the globe have deployed or are planning to deploy wireless mesh networks to unwire their cities and provide wireless broadband services to their citizens, enterprises and governments. Wireless mesh technology is gaining momentum.

SUMMARY

A method and system for radio frequency management (RFM) in a mesh network using a path distance factor (PDF) is disclosed. According to one embodiment, a computer-implemented method, comprises calculating a path distance factor (PDF) between a first mesh router and a portal. A frame is transmitted to a second mesh router, wherein the frame includes the path distance factor.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and system for radio frequency management (RFM) in a mesh network using a path distance factor (PDF) is disclosed. According to one embodiment, a computer-implemented method, comprises calculating a path distance factor (PDF) between a first mesh router and a portal. A frame is transmitted to a second mesh router, wherein the frame includes the path distance factor.

Each of the features and teachings disclosed herein can be utilized separately or in conjunction with other features and teachings to provide a method and system for radio frequency management (RFM) in a mesh network using a path distance factor (PDF). Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A method and system for radio frequency management in a mesh network using a PDF is disclosed. An enhancement version of path distance vector (PDV) is also disclosed.

Wireless mesh networks have several network management and control attributes. In most cases, no separate out-of-band control channel is provided. Network control or management messages are delivered in the same channel as data traffic. Unlike data traffic, however, network control or management messages usually start from the portal nodes, since most network management systems (NMSs) managing control or management messages are located on or behind the portal nodes. In addition, routes through mesh networks are often optimized for data forwarding. As a result, the management or control path may be suboptimal.

Figure 1:
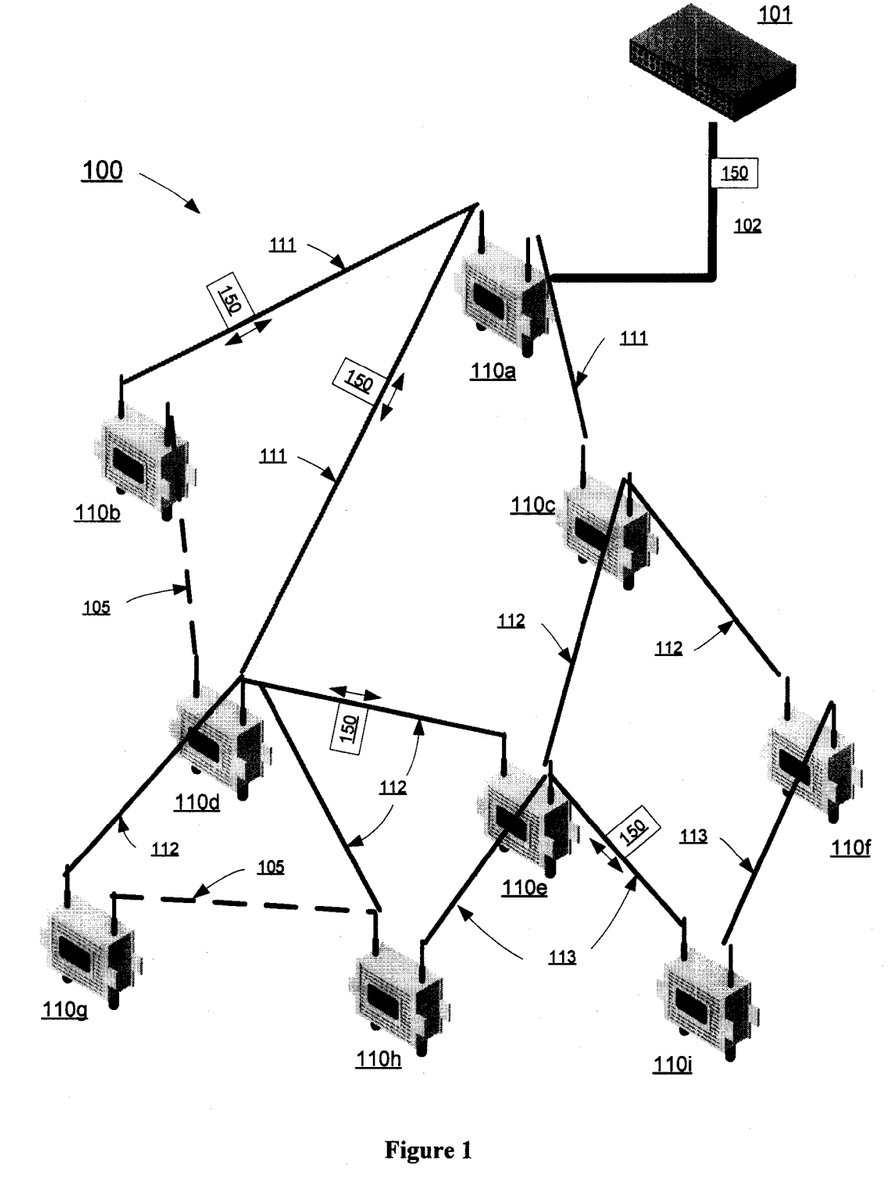
FIG. 1 illustrates an exemplary wireless mesh network topology, according to one embodiment.

FIG. 1 illustrates an exemplary wireless mesh network topology 100, according to one embodiment. Mesh router 110*a* is a portal that is connected to the wired network server 101 via wired network connection 102. The links 105, 111, 112 and 113 represent the wireless connections among mesh routers 110. Data may be sent from one mesh router 110 to any other mesh router 110 in the mesh network 100.

Network management messages are delivered to mesh routers in a different way. Regardless of the network management system (e.g., SNMP, XML-based NMS, HTTP-based Web management, SSH/Telnet-based command line interface (CLI) session), network management messages are sent from a wired network to every mesh router 110 in the mesh network 100 through the links 105, 111, 112 and 113.

To deliver network management messages, a spanning tree is formed. The spanning tree serves the purpose of generating a portal-based tree structure for a mesh network. The management messages start from the root of the spanning tree and spread the mesh network 100 in a hierarchical fashion.

If the spanning tree protocol (STP) is used, the portal 110*a* becomes the root. Bridge protocol data units (BPDUs) are exchanged among mesh nodes to form a spanning tree. When the spanning tree converges, a loop-free and hierarchy tree topology is formed. The network management messages reach every mesh node along the spanning tree from the root.

Starting from the portal 110*a*, the management message first reaches all of its direct neighbors 110*b*-110*d* via links 111. If a change in the management message affects the connectivity between two mesh routers 110, such a change must occur in a correct sequence, otherwise the connectivity between two mesh routers 110 may be permanently lost. For instance, if a link management message is issued to change link 111 between mesh router 110*a* and its direct neighbor mesh router 110*b* has to change, the change on mesh router 110*b* must occur prior to the change on mesh router 110*a* to avoid link failure. If the change occurs on mesh router 110*a* first, the link 111 between mesh routers 110*a* and 110*b* may be lost. As a result, the link management message can no longer be delivered to mesh router 110*b*, and the scheduled changes to mesh router 110*b* will never occur.

If the change occurs on mesh router 110*b* first, even if link 111 between mesh routers 110*a* and 110*b* may be lost afterwards, the link management message is delivered to both mesh router 110*b* and 110*a* in series. It is because the link management message issued from the wired network server 101 is delivered in such a way that the mesh routers 110 closer to network management server 101 receive the message earlier than the mesh routers 100 farther from network management server 101.

The same situation applies to other mesh routers 110 in the mesh network 100. To manage link 112 between mesh routers 110*d* and 110*g*, several paths may be used from network management server 101 to mesh router 110*g*, such as 110*a*-110*d*-110*g* and 110*a*-110*b*-110*d*-110*h*-110*g*. The path 110*a*-110*d*-110*g* is more reliable because it does not go through mesh router 110*h* which is relatively farther away from mesh router 110*a* than mesh router 110*d*. If the configuration changes happen on mesh router 110*d* first, it may affect all the links including the links between 110*d*-110*h* and between 110*d*-110*g*. Therefore, all the paths to mesh router 110*g* are not available after the changes occur on mesh router 110*d*. As a result, mesh router 110*g* and the network behind it become unreachable afterwards.

Although mesh routing solves the optimal path problem between each pair of nodes 110 in the mesh network 100, prior mesh networks have intrinsic problems for network management: the mesh network management source is located outside of the mesh network 100 and a separate control channel for the management is not provided. In addition, the spanning tree protocol has the following disadvantages:

1. STP does not scale to a large mesh network;
2. STP control messages add considerable burden to the mesh backhaul capacity;
3. STP does not provide a redundant path for reliability; and
4. STP typically supports only one root. In order to support multiple roots, multiple STP have to be run simultaneously, which further slows the backhaul communication.

Several prior tree-based mesh routing protocols have been proposed to address these issues with both mesh routing and mesh management at the same time. The tree-based topology of tree-based mesh routing protocols is simple and relatively stable, and it can support multiple roots. The tree-based topology, however, is not optimal for data forwarding since the peer-to-peer traffic has to go through common parent nodes. The tree-based topology also has difficulty in providing network-wide redundancy and load balancing.

Another challenging issue that mesh networking faces is the convergence problem. The convergence of all mesh routers to one connected network is not always guaranteed. For example, if all mesh routers 110 of the mesh network 100 power on simultaneously, it is not guaranteed to form a single mesh network. Mesh router 110a, 110b and 110c may form one network, mesh router 110d, 110g and 100h may form another network, and mesh router 110e, 110f, and 110i may form another network. Additionally, due to the dynamic nature of channel assignment, optimal channel assignment to the mesh routers is difficult to implement.

The current IEEE 802.11 draft proposes a plan to resolve the convergence issue of mesh networks by forcing all the mesh routers to converge to the same channel. It is, however, undesirable because all the mesh routers working on the same channel will interfere with one another, thus degrading the forwarding performance.

According to one embodiment, the mesh network 100 uses a PDF process to solve the management issue and the convergence issue of mesh networks in the 802.11 level. It takes advantage of the 802.11 beacon and adds no additional burden to the mesh network 100. It also provides network-wide redundancy to ensure fast recovery in the case of node or link failure.

The PDF is a mesh router's (eg. mesh router 110i) distance to the nearest portal (eg. mesh router 110a). The distance may be measured by a total number of hops to the portal 110a, by absolute time (regardless of the number of hops) to send or receive a packet from the portal 110a, by physical distance to portal 110a, or similar distance calculation. According to one embodiment, a portal's PDF may be set to zero or any value larger than zero to give different weight to different portals. To support multiple portals, radio frequency management (RFM)'s information element (IE) introduces an extra flag to indicate whether a mesh router is a portal or not.

Figure 3:
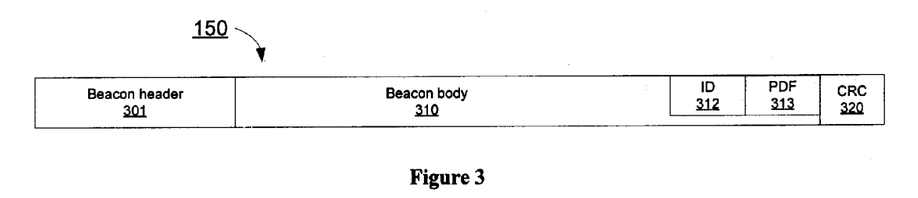
FIG. 3 illustrates an exemplary beacon frame containing a PDF, according to one embodiment.

FIG. 3 illustrates an exemplary beacon frame 150 containing a PDF 313, according to one embodiment. An IE extension may be added into the 802.11 beacon frame 150 by a router 110, such as PDF 313. The beacon frame 150 is periodically broadcast from a mesh router 110 to the neighboring mesh routers 110 to establish and maintain communication among the mesh routers 110. The beacon frame 150 includes a beacon header 301, beacon frame 310 and CRC 320. Beacon header 301 contains the source and destination medium access control (MAC) addresses as well as other information regarding the communications process. A beacon's frame body 310 includes a beacon interval representing the broadcast time between beacon frames, a timestamp used for the synchronization between the source and the destination, and other connection attributes such as service set identifier (SSID), supporting data rates, and encryption keys. According to one embodiment, PDF 313 is updated periodically within beacon frame 150. Other management frames such as a probe response frame may contain a PDF 313 as well. According to one embodiment, PDF 313 may store a 32-bit integer value.

According to one embodiment, instead of including only PDF 313, the mesh router 110 also inserts its own unique identifier in ID 312 into frame 150, together with one or more identifiers of mesh routers 110 on the path to the portal 110a into the beacon 150 and/or the probe response management frames.

Since the beacons 150 and the probe response management frames are received by the neighbor mesh routers 110 in the coverage area, they are broadcast only locally. Every mesh node's latest PDF 313 is announced to the neighbors 110 in the coverage area. In contrast, STP protocols use protocol messages and timers, thus adding a greater burden to the limited wireless connection.

When powered on, each mesh router 110 initializes its own PDP 313 to infinite, which implies that it does not have a valid link to any portal. If the mesh router 110 is a portal 110a, which is known either from the configuration or the user CLI, the portal 110a changes its own PDF 313 to the user-specified value or a default pre-configured portal PDF (e.g., zero in the simplest case). When each mesh router 110 periodically broadcasts its PDF 313 via beacons 150, all the neighbors receive the updated PDF value 313.

Figure 2:
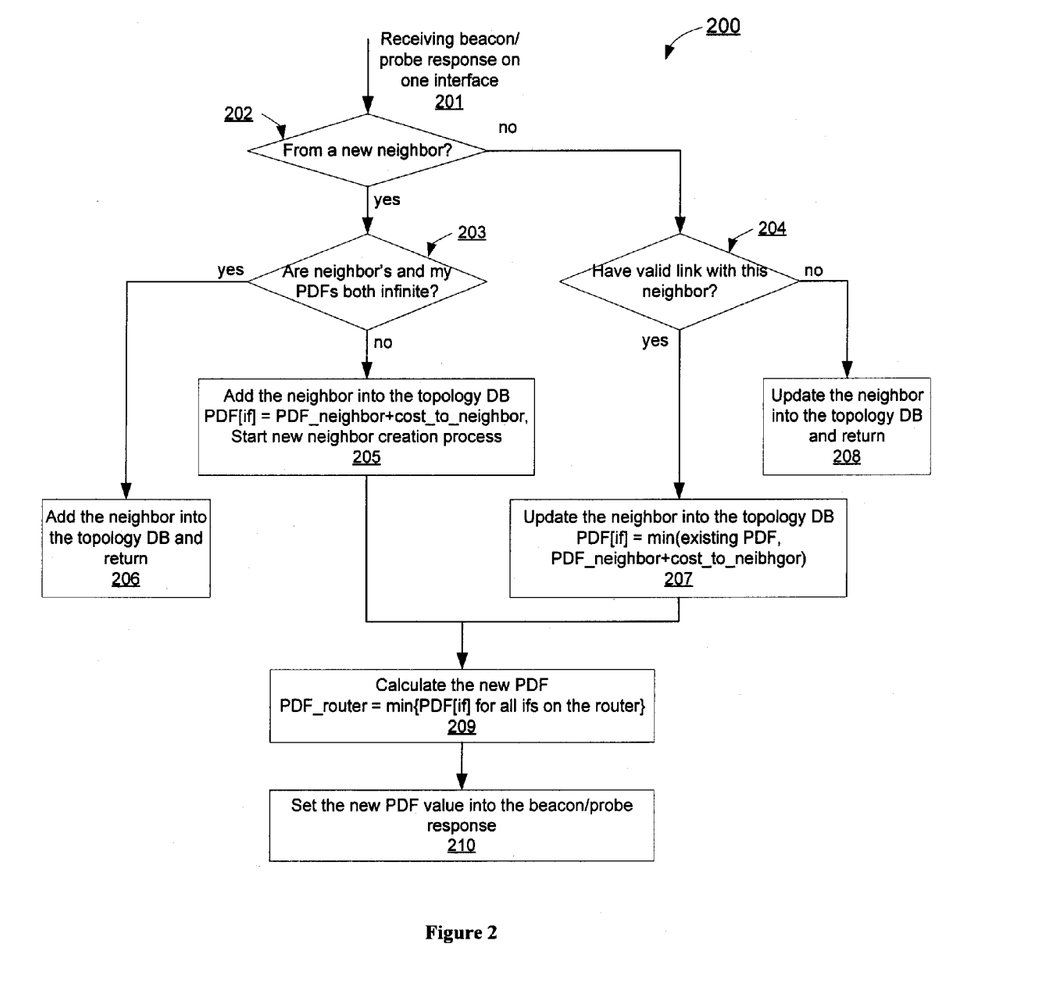
FIG. 2 illustrates an exemplary path distance factor (PDF) update process of a mesh router in a mesh network, according to one embodiment.

FIG. 2 illustrates an exemplary PDF update process of a mesh router 110 in a mesh network 100, according to one embodiment. The mesh router 110 performs an update for its PDF by receiving a beacon (201). Each radio of a mesh router maintains a topology database containing the list of all scanned neighbors, called a candidate list. The radio selects the neighbors with valid links from the candidate list. The neighbors that have valid links with the mesh router form a neighbor list. Upon receiving a PDF update from a neighbor, the mesh router checks if the neighbor is a new neighbor (202).

If the neighbor is new to mesh router 110, it is added to the topology database of mesh router (205 and 206). At this point, the PDFs of the neighbor and the mesh router 110 are checked for connectivity to the portal. When connected to the portal, PDF 313 of the mesh router 110 or the neighbor is set to a finite number. If PDFs 313 of the mesh router 110 and the neighbor are not both infinite, i.e. either the neighbor or the mesh router 110 has a valid connection to the portal, the PDF of the mesh router 110 through the interface to the neighbor is set to the summation of the neighbor's PDF and the cost to the neighbor (205). The cost to the neighbor is determined by various factors, for example, the physical distance between the mesh router and the neighbor, the number of channels available to the link, signal strength and the noise level.

If the neighbor is not new, the mesh router checks if it has an existing link to the neighbor (204). If the mesh router has an existing link to the neighbor, the mesh router checks if its PDF needs to be updated (207). If the mesh router does not have a valid link to the neighbor, the neighbor remains in the candidate list and the topology database is updated accordingly (208).

When updating PDF 313 of a mesh router, it is possible that the mesh router's own PDF is infinite while the neighbor's PDF is a finite number. In that case, the mesh router is still in an 'island' state (e.g., it does not have an established path to reach to the portal while the neighbor already has a valid path.) Under this circumstance, the mesh router escapes the 'island' state by immediately sending out a link establishment request to the neighbor.

The interface to each neighbor has a PDF associated with it, and the mesh router's total PDF is determined by the minimum value of the PDFs of all interfaces (209);

$$PDF = \min_{if=1\_to\_N} \{PDF(if)\},$$

where N is the total number of neighbors of a mesh router. When the PDF is calculated, it is stored in the topology database of the mesh router.

According to one embodiment, multiple portals may be supported by assigning different PDFs to different portals. Multiple portals are given different initial PDF values, thus the links to the portals are quantitatively represented by the PDF so that the loads to portals can be efficiently monitored and balanced.

According to one embodiment, each neighbor's PDF is associated with a time-out timer. If the mesh router does not receive a beacon or probe response message from the neighbor within the time-out period, the neighbor's PDF is reset to infinite indicating that the connection to the portal is lost. The new PDF is updated in the topology database accordingly.

Figure 4:
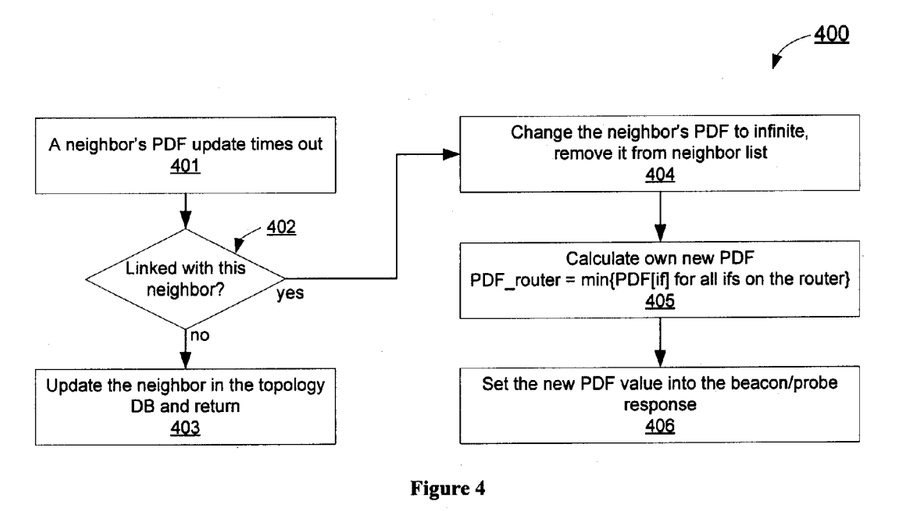
FIG. 4 illustrates an exemplary time-out process of a PDF, according to one embodiment.

FIG. 4 illustrates an exemplary time-out process of a PDF 313, according to one embodiment. When the PDF update times out on a mesh router, it is reported to the neighbors (401). Similar to the PDF update process, the mesh router checks the validity of the link to the neighbor that reported the time-out (402). If there is no valid link to the neighbor, the topology database of the mesh router is simply updated (403). If a valid link is detected to the neighbor, the neighbor is moved from the neighbor list to the candidate list or set to a 'down' state (404). When the neighbor is removed from the candidate list, the PDF of the mesh router is updated (405) and set to a new PDF value (406) if it changed.

According to one embodiment, the PDF method builds a loop-free tree topology in a mesh network. This loop-free tree topology supports link redundancy; when a link is removed because of the time-out process or broken for some reason, another link to one of the neighbors is formed based on the minimum of PDF available on the mesh router. Each link's weight is taken into consideration when calculating the PDF of the link. Multiple portals are supported by giving them different PDF weights to prioritize the order of connection to the multiple portals for a given mesh router.

To ensure a loop-free tree, the PDF method uses an enhanced diffusing update algorithm (DUAL). DUAL is designed to solve the issue of mesh routing topology loop. A full set of DUAL is unnecessary.

Each node builds its topology with the PDF information received from all neighbors. The topology database stores each neighbor's PDF and its cost to the each neighbor. The neighbor's PDF is the neighbor's cost to the nearest portal. The mesh router's PDF is the summation of the neighbor's PDF and the mesh router's cost to that neighbor. The neighbor providing the minimum PDF is referred to as a successor of the mesh router.

Figure 5:
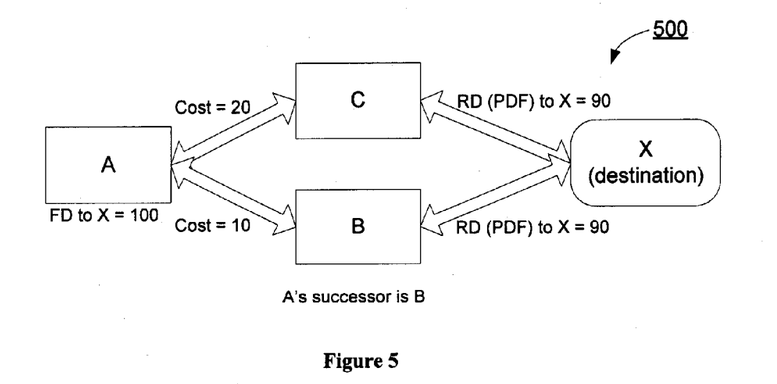
FIG. 5 illustrates an exemplary process for constructing a loop-free tree using the PDF, according to one embodiment.

FIG. 5 illustrates an exemplary process for constructing a loop-free tree using the PDF, according to one embodiment. Mesh router B's reported distance (RD) to destination X is 90. Mesh router C also has an alternate route to destination X, which also has the RD of 90. The PDF from mesh router A to destination X is determined by the summation of the RD of a successor and the cost to the successor. Since the cost from mesh router A to mesh router C is higher (20) than the cost from mesh router A to mesh router B (10), mesh router A chooses mesh router B as the successor and sets its PDF to destination X as 100.

Although mesh router A does not use mesh router C as the successor, mesh router A still saves mesh router C's information, together with its RD (i.e. PDF) to destination X in its topology database. If the link from mesh router A to mesh router B breaks, mesh router A chooses mesh router C as the new successor and updates its PDF to destination X to 110 by summing the cost to mesh router C (20) and the RD from mesh router C to destination X (90).

Mesh router A safely decides whether or not the path to destination X is loop-free by comparing mesh router C's RD (90) with mesh router A's original feasible distance (FD) (100). If the RD of mesh router C is less than the original FD of the mesh router A, mesh router C satisfies the feasibility condition (FC) in the DUAL calculation and becomes the feasible successor (FS) of mesh router A. From the example of FIG. 5, mesh router C's RD (90) to destination X is less than the original FD of mesh router A to destination X (100). This indicates that mesh router C's path to destination X is not through mesh router A, therefore mesh router A can safely choose mesh router C as the new successor.

If mesh router C's RD value is higher than mesh router A's original FD, mesh router C's path to destination X might be through mesh router A, which might lead to forming a loop. The enhanced DUAL algorithm comparing the original FD and the RD of a candidate successor guarantees the construction of a loop-free tree.

Each mesh router calculates the PDFs to destination via all candidate FS and picks the minimum PDF as its PDF. If more than one FS yields the same minimum PDF, all of them may become the mesh router's successors. When the topology of the mesh network changes, the existence of a FS locally available in the topology database facilitates the convergence. If the FS is not locally available, the mesh router sends out queries to the neighbors. The query propagates (or "diffuses") until it is received by the FS of the mesh router. According to one embodiment, the neighbors that did not find the FS in response to the query return a message notifying that the FS is unreachable.

After a neighbor is selected, the one with a larger PDF sends out a link establishment request to the other end. If a mesh router receives a link establishment request from a neighbor with a smaller PDF, the request is denied. It allows the request only from a neighbor with a larger PDF to be accepted to guarantee forming a loop-free tree.

According to one embodiment, the mesh network forming process is directional. The one with a larger PDF is the link establishment initiator. This brings more benefits than just ensuring a loop-free tree. When the receiver gets the link establishment request, it evaluates the overall channel utilization condition and specifies on which channel the connection is allowed to be established.

Each radio interface of a mesh router runs an independent state machine. According to one embodiment, the state machine consists of four different states; DISCOVERING, SCANNING, CONNECTING and CONNECTED. The DISCOVERING state is the state where the radio does either passive scanning or active scanning. This state is the initial state when the radio is enabled to backhaul mode and its wireless distribution system (WDS) mode is set to automatic. If any neighbor is found to be in a SCANNING state, the radio of the mesh router enters the CONNECTING state and tries to establish a valid connection to the neighbor. If any valid link connection is established and the mesh router's PDF is confirmed to be finite, the radio enters the CONNECTED state.

In any state, if the radio interface receives a request to connect from a neighbor with a larger PDF, it responds to the connect request. Since each radio periodically enters passive scanning mode even after a valid link is established, the radio will eventually find all neighbors on all available channels.

The PDF propagation starts from the roots (i.e. the portals) and reaches every node in the mesh network. After the convergence, the loop-free tree is constructed. Since the portals are given finite PDFs, other nodes change their default PDFs (infinite) to finite values after finding a valid path to one of the portals. If a mesh router still has the default PDF, it is considered to be in an island state. While the mesh router remains in the island state, it tries to establish a connection to a neighbor to escape the island state.

The PDF process ensures the convergence of the mesh network rooted from the portals. It also provides a mechanism for optimizing the channel selection during the mesh forming. The root mesh routers (i.e. the portals) select the best channel first and propagate its choice to the children mesh routers. The children mesh routers subsequently select the best channel from the remaining channel pools until all the children mesh routers select channels to their neighbors.

The root mesh router has a higher priority than the children mesh routers in selecting the best channel available at the time of mesh forming. Each mesh router, whether it is a root or a child, makes a local decision to select the best channel taking into consideration various conditions such as, interference with the neighbors, signal strength and noise level. This procedure provides a near-optimal channel selection scheme for the entire mesh network.

If the channel selection is executed by a channel planner (e.g., a mesh router of a third device) in an absolute fashion, the channel planner is required to have a global picture of the entire mesh network for optimal channel selection. In reality, the global picture of the entire mesh network is typically unavailable to any single mesh router in the mesh network. The near-optimal channel selection scheme follows the tree buildup process and allows the portals (i.e. the root mesh routers) to select the best channel before the children mesh routers have a chance to select their best channels.

Each mesh router includes multiple PDFs and multiple unique IDs (named node IDs) in the beacon and/or probe response frames. Each pair of <node ID, PDF> forms a PDF vector, called a path distance vector (PDV). According to one embodiment, the PDV information is used to select a FS of the mesh router. A mesh router broadcasts its PDV information and collects the PDV information from all its neighbors. If the neighbor satisfies the feasibility condition, it becomes a FS of the mesh router. The feasibility condition checks whether the neighbor's PDV includes the mesh router or not. In order to become a valid FS of a mesh router, the neighbor's PDV must not include the mesh router. If the neighbor's PDV does include the mesh router, a loop tree is formed and it violates the feasibility condition.

The PDV enables a mesh router to announce its complete or partial path to the portal, which provides much more information to help mesh forming and error recovery. In FIG. 1, mesh router 110g includes a path to the portal 110a in the beacon frame, i.e., 110g-110d-110a. Similarly, mesh router 110i announces a path to the portal 110a: 110i-110f-110c-110a.

The PDV approach does not require the mesh router to announce the complete path, nor all possible paths. According to one embodiment, the PDV threshold is used to limit the total number of mesh nodes that may be announced in the management frame. The minimum value is two and it is recommended to be between four and ten depending on the scale of the mesh network. The PDV threshold serves two purposes: it limits the size of beacon and/or probe response frame, and it divides the mesh network into layers.

The PDV threshold specifies the maximum number of mesh nodes that each mesh router may announce in the management frame. Referring to FIG. 1, if the PDV threshold is set to two, each mesh router may announce up to two PDVs. For example, the portal 110a announces <110a,0> using the beacon. Mesh router 110b announces <110b,1> and <110a,0>. Mesh router 110i announces <110i,6> and <110f,3>. The PDV threshold divides the mesh network into different layers, with different ranges of PDF. For example, all mesh routers with PDFs in the range of [0,1] form a first layer; all mesh routers with PDFs in the range of [2,3] form a second layer, and so on.

Figure 6:
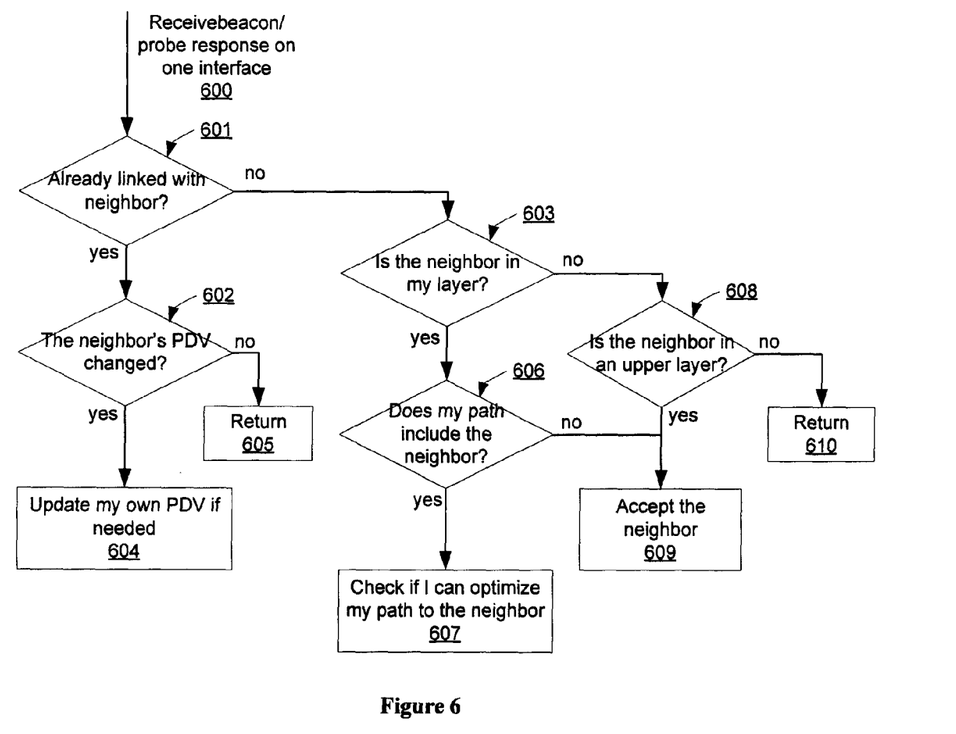
FIG. 6 illustrates the flow-chart of an exemplary path distance vector (PDV) process, according to one embodiment.

FIG. 6 illustrates the flow-chart of an exemplary PDV process, according to one embodiment. When a mesh router receives a beacon or probe response from a neighbor, it performs the following operation to update the PDV. If the mesh router already has a link with the neighbor (601), the PDV for the neighbor is checked if it was changed from the previous value (602). If the PDV was changed, it is updated on the mesh router's topology database (604), otherwise, no action is required (605). If no link is established with the neighbor, the PDV for the neighbor is checked if it is in the same layer as the mesh router (603). If it is in the same layer, the mesh router further checks if its path includes the neighbor (606). If the path includes the neighbor, the mesh router further checks if the path to the neighbor can be optimized (607), otherwise, it just accepts the neighbor and updates on the topology database (609). If the neighbor is not in the same layer as the mesh router (603), the layer of the neighbor is further inspected if it belongs to an upper layer (608). If it belongs to an upper layer, the neighbor is accepted and the topology database of the mesh router updates (609), otherwise it returns without taking any action (610). As a result, the PDV process allows only the mesh routers in an upper layer to connect to mesh routers in a lower layer, thus preventing forming loops in the mesh network.

Because the PDV process requires more fields in the management frame, it performs many logic comparisons to prevent loops. However, the PDV process does not need to run the full DUAL algorithm, therefore there is no need to maintain the RD database. The PDV method also provides good scalability since the PDV threshold is dynamically adjusted to accommodate different mesh scales.

Figure 7:
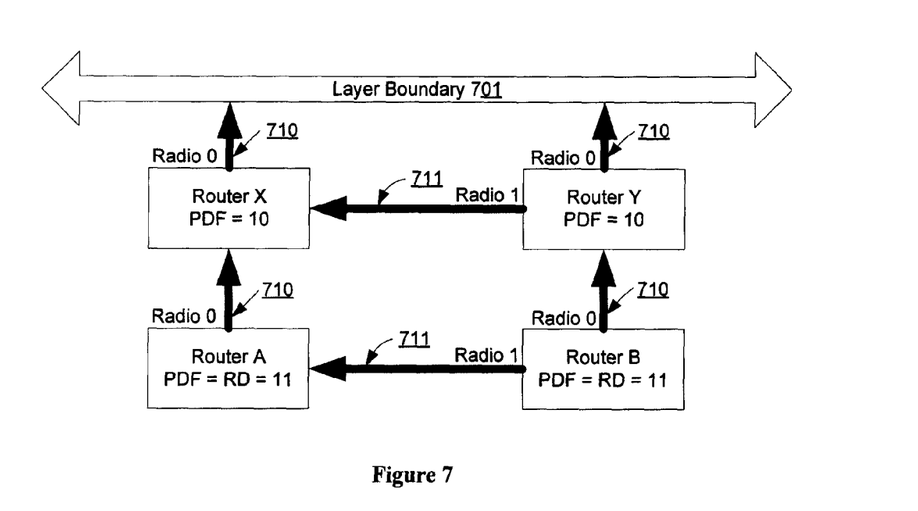
FIG. 7 illustrates an exemplary process for redundant links and fast recovery using a PDV, according to one embodiment.

With the partial path information, the PDV process achieves fast recovery. FIG. 7 illustrates an exemplary process for redundant links and fast recovery using a PDV, according to one embodiment. Suppose that the mesh router X and the mesh router Y can hear each other. Mesh router A and mesh router B can also hear each other. Both mesh router X and mesh router Y use the radio interface 0 to connect to the layer boundary 701 directly.

According to the present PDF process, all links 710 are built to form a loop-free tree. The links 710 and 711 are started from the link establishment initiator. If the PDV process is used, links 711 are also established because mesh routers X and Y have the same PDF. Because mesh router Y does not satisfy mesh router X's feasibility condition, neither does mesh router X. However, mesh router X can also check if mesh router Y's path to the layer boundary 701 has included mesh router X itself. If it is not included, mesh router X selects mesh router Y as a valid neighbor. Mesh router B selects mesh router A as a valid neighbor for the same reason.

Although mesh router B has two paths to reach the layer boundary 710, (eg., the path via Y and the path via A-X) it writes its shortest path in the beacon frame.

In case of node failure, the mesh router can recover the failure faster using the PDV method due to the redundant path. In the case of PDF, if mesh router X's radio interface 0 fails, mesh router X sets its own PDF to infinite and then scans for all neighbors to find mesh router A as the new parent. In the case of PDV, on the other hand, mesh router X immediately uses the link 711 to mesh router Y without any traffic loss. The link 711 is a trusted loop-free link because when mesh router Y initializes the link establishment request, it has already done the loop-free check, as has mesh router X. Since both ends have already done loop-free checks, link 711 may be immediately used without additional validation.

The PDV method does not build a loop-free tree. It actually builds a more classic mesh network; a time-out mechanism and maximum PDF are implemented to prevent a loop. However, the PDV method does not have any classic distance vector problems such as count-to-infinite due to the partial or full path information advertised in the beacon or other management frames. It efficiently prevents local looping in the same layer. It distinguishes itself from any classic distance vector method in that a mesh router accepts new neighbors only if the neighbor is either in an upper layer or in the same layer but is not included in the path.

With the PDV method, every node in the mesh network reports partial or full path information to the nearest portal. Every node constructs the list of neighbors based on the information received according to the layer rule. In comparison, PDF does not have layer concept at all. Each node in the PDF announces only its distance to the nearest portal to build a loop-free tree. The PDF method ensures a converged mesh network and adds the depth information to each mesh router in the mesh network.

Referring to FIG. 1, suppose that there exists no active connections and all mesh routers 110b-110i have just powered on except the portal 110a.

Since mesh routers 110b-110i powered on without the portal 110a and all their PDFs are set infinite by default, they enter the DISCOVERING state. They may find neighbors to connect to during the DISCOVERING state, but their PDFs remain infinite.

Valid links can be formed among mesh routers 110b-110i, such as links 112 and 113 in FIG. 1. But these links do not cause the mesh router's PDF to change, because all of them have the same infinite PDFs. When the portal 110a powers up, it starts announcing its finite PDF (e.g., 0) to its direct neighbors using the beacon frame.

Mesh routers 110b, 110c and 110d receive the portal 110a's beacon after it powered up. Since mesh routers 110b, 110c and 110d all have infinite PDFs when the portal 110a's beacon was received, they send out link establishment requests to the portal 110a.

The portal 110a then determines which channel the connections are allowed, accepts those link establishment requests, and notifies which channel to establish links. After establishing valid links to the portal 110a, mesh routers 110b, 110c and 110d set their PDFs appropriately and announce the new PDF in the beacon frame. The remaining mesh routers 110e-110i subsequently receive the updated PDF of their neighbors, and the same link request and the PDF update processes repeat. Note that some previously established links may be removed in the later channel assignment. For example, mesh router 110d may already have some links established for mesh routers 110e, 110g and 110h. After the portal 110a notifies mesh router 110d to establish a link to itself on a certain channel that is different from the channel to the existing links, the existing links on mesh router 110d might be removed.

The same mesh network construction process propagates to all mesh routers in the network. As a result, a loop-free tree is constructed in the mesh network and the near-optimal channel assignment scheme is achieved from the portal to all mesh routers in the mesh network.

To demonstrate the process of node recovery, suppose that mesh router 110d is down. Two cases should be considered; if mesh router 110d goes down gracefully, it will send a link down notification to its neighbors, so mesh routers 110e, 110g and 110h will handle the down event gracefully. But if mesh router 110d goes down suddenly without any notification, mesh routers 110e, 110g and 110h have to rely on the time-out mechanism to time out connections to mesh router 110d.

After the link to mesh router 110d is down, the mesh router 110g's PDF becomes infinite again. This is because the link to mesh router 110d is the mesh router 110g's only link to the portal 110a. After the link goes down, the mesh router 110g's other link (i.e., link to mesh router 110h) may have a finite PDF. In this case, mesh router 110g enters the DISCOVERING state to find a new path to the portal 110a. Suppose that mesh router 110b and 110h are discovered. Since mesh router 110b has a smaller PDF than that of mesh router 110h, mesh router 110g sends out a link establishment request to elect mesh router 110b. If mesh router 110b still has the bandwidth to accept a new link, it accepts mesh router 110g's request. Otherwise, mesh router 110g will try mesh router 110h after several retries with mesh router 110b. To facilitate the process, mesh router 110b may send a rejection back to mesh router 110g after first trial, so it can try mesh router 110h without retrying mesh router 110g.

When mesh router 110b accepts the mesh router 110g's request, the new link is established and mesh router 110g updates its PDF appropriately. After mesh router 110d is down, mesh router 110e does not need to go back to the DISCOVERING state since it has a backup link to mesh router 110c. It will update its PDF accordingly and use the link to mesh router 110c to reach the portal 110a. If a PDV process is used, the path information is also updated. Mesh router 110h also has a backup link to mesh router 110e. It uses this link and updates its PDF, accordingly.

A method and system for radio frequency management (RFM) in a mesh network using a path distance factor (PDF) have been disclosed. Although the preferred embodiments of the present invention have been illustrated and described in detail, it will be readily apparent to those skilled in the art that various modifications may be made therein without departing from the sprit of the present invention or from the scope of the appended claims.

We claim:

1. A computer-implemented method for managing a wireless mesh network, comprising:
   calculating a path distance factor between a first mesh router and a portal, the portal being connected to a wired network server and the path distance factor being used to formulate a loop-free topology in the wireless mesh network; and
   transmitting a frame to a second mesh router, wherein the frame includes the path distance factor.

2. The computer-implemented method of claim 1, wherein the frame is a beacon.

3. The computer-implemented method of claim 1, wherein the frame is a probe response management frame.

4. The computer-implemented method of claim 1, further comprising initializing the path distance factor to a value representing infinite distance when the first mesh router is powered.

5. The computer-implemented method of claim 1, further comprising setting the path distance factor to a predetermined value when the first mesh router is the portal.

6. A computer-implemented method, comprising:
   receiving a beacon at a first mesh router, the beacon including a second path distance factor of a second mesh router; and
   calculating a first path distance factor of the first mesh router using the second path distance factor, wherein the first path distance factor indicates a distance from the first mesh router to a portal that is connected to a wired network server.

7. The computer-implemented method of claim 6, further comprising:
   determining if the second mesh router exists on a neighbor list of the first mesh router; and
   updating a topology database of the first mesh router if the second mesh router is not on the neighbor list.

8. The computer-implemented method of claim 7, further comprising establishing a link to the second mesh router.

9. The computer-implemented method of claim 6, wherein the first path distance factor is the minimum path distance factor value of a plurality of path distance factor values including the second path distance factor.

10. The computer-implemented method of claim 7, further comprising using a diffusing update algorithm to generate a loop free topology in the topology database.

11. A non-transitory computer-readable medium having stored thereon a plurality of instructions, said plurality of instructions when executed by a router being part of a wireless mesh network, cause said router to perform:
    calculating a path distance factor between a first mesh router and a portal; wherein the portal is connected to a wired network server; and
    transmitting a frame to a second mesh router, wherein the frame includes the path distance factor, the path distance factor being used to formulate a loop-free topology in the wireless mesh network.

12. The non-transitory computer-readable medium of claim 11, wherein the frame is a beacon.

13. The non-transitory computer-readable medium of claim 11, wherein the frame is a probe response management frame.

14. The non-transitory computer-readable medium of claim 11 having stored thereon-additional instructions, said additional instructions when executed by a computer, cause said computer to further perform initializing the path distance factor to a value representing infinite distance when the first mesh router is powered.

15. The non-transitory computer-readable medium of claim 11 having stored thereon-additional instructions, said additional instructions when executed by a computer, cause said computer to further perform setting the path distance factor to a predetermined value when the first mesh router is the portal.

* * * * *